G. R. EAGER.

Pants and other Garments.

No. 6,280. Reissued Feb. 9, 1875.

Witnesses:

D. G. Stuart

A. McCallum

Inventor:

George R. Eager per

P. Henway

Attorney

UNITED STATES PATENT OFFICE.

GEORGE R. EAGER, OF BOSTON, MASSACHUSETTS.

IMPROVEMENT IN PANTS AND OTHER GARMENTS.

Specification forming part of Letters Patent No. 127,750, dated June 11, 1872; reissue No. 6,280, dated February 9, 1875; application filed November 18, 1874.

*To all whom it may concern:*

Be it known that I, GEORGE R. EAGER, of Boston, in the county of Suffolk and State of Massachusetts, have invented a certain new and useful Improvement in Garments, of which the following is a description, reference being had to the accompanying drawing of the same making part of this specification, in which—

Figure 1:
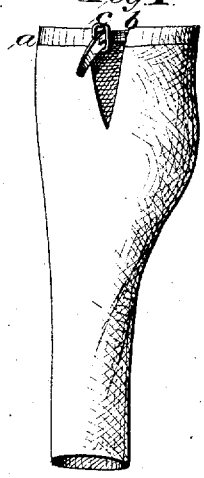
Figure 2:
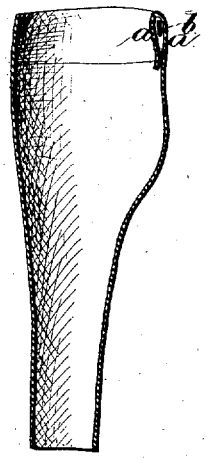

Figure 1 represents a side elevation of a pair of pants having my improvement applied thereto; Fig. 2, a longitudinal section; and Fig. 3, a cross-section of the same as taken through the waistband.

My invention has for its object the adapting of pants or other garments having different-sized waists to one and the same person, or the adapting of a single garment, so that it may be made to fit persons having different-sized waists.

The invention to carry these purposes into effect consists, first, in providing the garment with a hollow waistband of a length sufficient to meet the average adjustments required; secondly, in inserting and securing a strap therein of nearly equal or greater length to admit of the required adjustments; and, thirdly, of a buckle suitably secured to some other portion of the waistband or pants, that proper connection may be made with the strap to effect the adjustment.

To enable others skilled in the art to make, construct, and use my invention, I will now describe its parts in detail.

Figure 3:
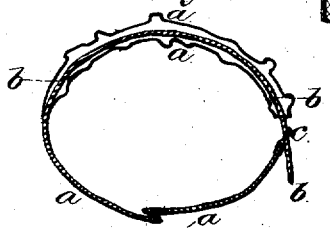

The drawings illustrate my improvement as applied to the rear half or portion of the waistband of a pantaloon garment, and which for the purpose is made hollow, as shown in Figs. 2 and 3. Within this hollow is inserted and secured a strap, *b*, the unattached end of which is intended to be connected with a buckle, *c*, which is suitably secured to the side or front of the pants. The garments may be continuous around the waistband, or they may be made with a slit, such as that shown in Figs. 1 and 3. This is frequently desirable in cases where the strap, in order to fit the person, is obliged to be let out to the full end of its length, but not otherwise.

In fitting one of these garments of a tolerably large size to persons having a rather slender waist, in drawing the strap tight the waistband and garments will draw up in the manner of a corrugation, as shown in Fig. 3.

The strap *b*, if desired, may be made to form a prolongation of that portion of the waistband which is not made hollow. In practice it is found amply sufficient to simply make the rear half of the waistband hollow (as garments of relatively different-sized waists are, for other reasons, required to be made) in order to supply the exigencies of the trade.

Having described my improvement, what I claim as new, and desire to secure by Letters Patent, is—

A hollow waistband for pantaloons and other garments, when provided with a strap and buckle arranged in the manner and for the purpose set forth.

GEORGE R. EAGER.

Witnesses:

MOSES S. TOWER,

HATTIE A. EAGER.